United States Patent
Lee et al.

(10) Patent No.: US 11,862,990 B2
(45) Date of Patent: Jan. 2, 2024

(54) WIRELESS CHARGING DEVICE AND METHOD FOR CHARGING ELECTRONIC DEVICE USING THE SAME

(71) Applicant: Samsung Electronics Co., Ltd., Gyeonggi-do (KR)

(72) Inventors: Wooram Lee, Gyeonggi-do (KR); Dohyeon Kim, Gyeonggi-do (KR); Seho Park, Gyeonggi-do (KR); Mingi Song, Gyeonggi-do (KR)

(73) Assignee: Samsung Electronics Co., Ltd

( * ) Notice: Subject to any disclaimer, the term of this patent is extended or adjusted under 35 U.S.C. 154(b) by 408 days.

(21) Appl. No.: 17/178,707

(22) Filed: Feb. 18, 2021

(65) Prior Publication Data

US 2021/0273491 A1 Sep. 2, 2021

(30) Foreign Application Priority Data

Feb. 28, 2020 (KR) .................. 10-2020-0025130

(51) Int. Cl.
*H02J 7/00* (2006.01)
*H02J 50/40* (2016.01)
*H02J 50/80* (2016.01)
*H02J 50/12* (2016.01)

(52) U.S. Cl.
CPC ............ *H02J 50/402* (2020.01); *H02J 50/12* (2016.02); *H02J 50/80* (2016.02); *H02J 2310/22* (2020.01)

(58) Field of Classification Search
USPC .................. 320/106, 107, 108, 109, 110, 112
See application file for complete search history.

(56) References Cited

U.S. PATENT DOCUMENTS

| 9,511,674 B2 | 12/2016 | Keeling et al. |
| 2014/0253025 A1 | 9/2014 | Van Wiemeersch et al. |
| 2017/0008405 A1 | 1/2017 | Bojarski et al. |
| 2017/0310164 A1 | 10/2017 | Abdolkhani et al. |
| 2018/0090998 A1* | 3/2018 | Jol ................... H02J 7/0042 |
| 2018/0131219 A1 | 5/2018 | Kim et al. |

(Continued)

FOREIGN PATENT DOCUMENTS

| WO | WO 2019/004753 | 1/2019 | |
| WO | WO-2019004753 A1 * | 1/2019 | ............. H01F 38/14 |

OTHER PUBLICATIONS

International Search Report dated May 7, 2021 issued in counterpart application No. PCT/KR2021/001398, 7 pages.

*Primary Examiner* — Brian Ngo
(74) *Attorney, Agent, or Firm* — The Farrell Law Firm, P.C.

(57) ABSTRACT

A wireless charging device is provided and includes a first inverter, a first switch electrically connected to the first inverter, a second inverter, a second switch electrically connected to the second inverter, a first coil group connected to the first inverter through the first switch, a second coil group connected to the second inverter through the second switch, and a processor operatively connected to the first inverter, the first switch, the second inverter, the second switch, the first coil group, and the second coil group. The processor detects an electronic device disposed above the wireless charging device through at least one coil in the first coil group or the second coil group, and to wirelessly transmit power to the electronic device by using one coil in the first coil group and one coil in the second coil group.

17 Claims, 10 Drawing Sheets

(56) References Cited

U.S. PATENT DOCUMENTS

2019/0104569 A1     4/2019   Moon et al.
2019/0124727 A1*   4/2019   Moon ................... H05B 6/062
2019/0327794 A1*   10/2019   Kwack .................. H05B 6/065
2020/0036229 A1*   1/2020   Pinciuc .................. H02J 50/90
2020/0244108 A1     7/2020   Kim et al.
2022/0285988 A1*   9/2022   Partovi ................ H02J 50/402

* cited by examiner

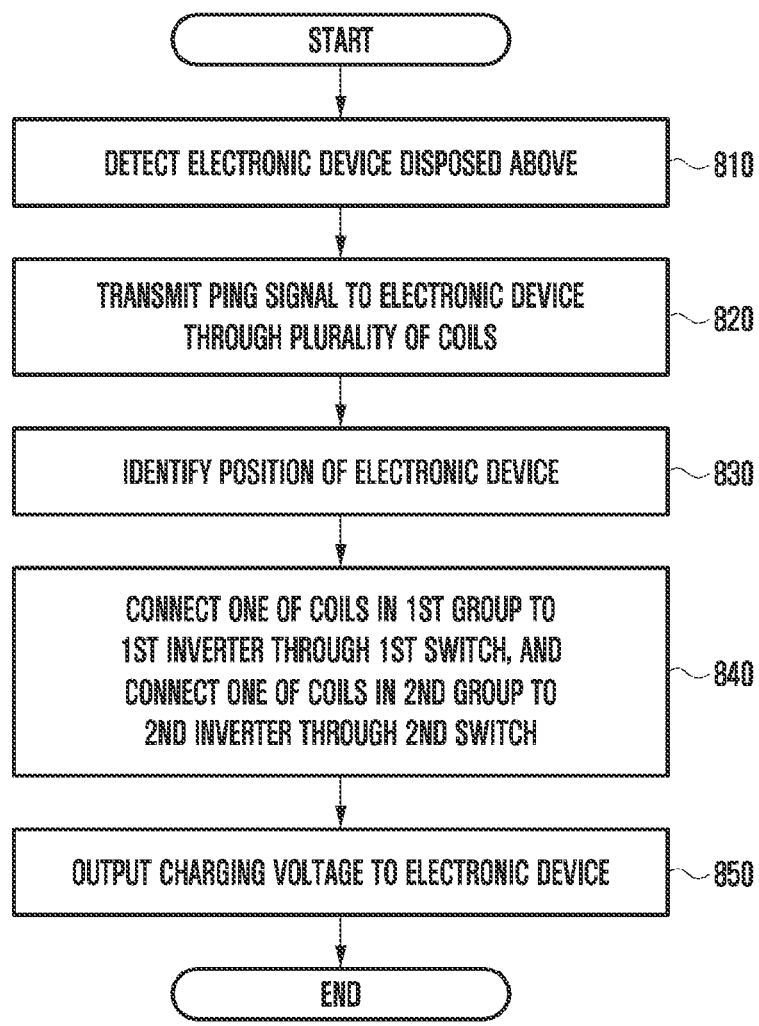

WIRELESS CHARGING DEVICE AND METHOD FOR CHARGING ELECTRONIC DEVICE USING THE SAME

CROSS-REFERENCE TO RELATED APPLICATION(S)

This application is based on and claims priority under 35 U.S.C. § 119 to Korean Patent Application No. 10-2020-0025130, filed on Feb. 28, 2020, in the Korean Intellectual Property Office, the entire disclosure of which is incorporated herein.

BACKGROUND

1. Field

The disclosure relates to a wireless charging device including a plurality of coils and method for charging an electronic device by using the wireless charging device.

2. Description of Related Art

Recently, the use of various kinds of portable electronic devices such as a smart phone and a tablet PC is increasing. These electronic devices are inherently portable and may include a battery to supply power required for their operation. In addition, the electronic devices may charge the battery by receiving power from an external power source in a wired or wireless manner.

Wireless charging of the electronic device uses wireless power transmission and reception. That is, instead of connecting a separate wired connector to the electronic device, only close contact, such as placing the electronic device on a wireless charging device, makes it possible to charge the battery.

As wireless charging schemes for the electronic device, there are an electromagnetic induction scheme using coils, a resonance scheme using resonance, and a radio wave radiation scheme converting electric energy into microwaves.

For example, the electromagnetic induction scheme using coils performs charging by wirelessly transferring power from a wireless charging device (i.e., a wireless charging transmitter) to an electronic device (i.e., a wireless charging receiver) while using a magnetic field induced through the coils.

In the electromagnetic induction scheme, charging efficiency is high when the coil of the wireless charging device and the coil of the electronic device are aligned with each other. In order to facilitate alignment between the coils, the wireless charging device may include a plurality of coils.

However, the electromagnetic induction scheme performs the wireless charging of the electronic device by using only one of the plurality of coils. Thus, there is a problem in that the charging speed is slow and the charging efficiency is low.

SUMMARY

Various embodiments of the disclosure provide a wireless charging device and method capable of charging an electronic device by using a plurality of coils grouped and provided in different layers.

According to an embodiment, a wireless charging device includes a first inverter, a first switch electrically connected to the first inverter, a second inverter, a second switch electrically connected to the second inverter, a first coil group connected to the first inverter through the first switch, a second coil group connected to the second inverter through the second switch, and a processor operatively connected to the first inverter, the first switch, the second inverter, the second switch, the first coil group, and the second coil group. The processor may be configured to detect an electronic device disposed above the wireless charging device through at least one coil in the first coil group or the second coil group, and to wirelessly transmit power to the electronic device by using one coil in the first coil group and one coil in the second coil group.

According to an embodiment, a method for charging an electronic device by using a wireless charging device includes, at a processor of the wireless charging device, detecting the electronic device through at least one coil in a first coil group or a second coil group; at the processor, transmitting a ping signal to the electronic device through each of the first coil group and the second coil group; at the processor, identifying a position of the electronic device upon receiving a feedback signal for the ping signal from the electronic device; at the processor, connecting a first inverter and one coil in the first coil group through a first switch and connecting a second inverter and one coil in the second coil group through a second switch; and at the processor, wirelessly transmitting power to the electronic device by using the one coil in the first coil group and the one coil in the second coil group.

BRIEF DESCRIPTION OF THE DRAWINGS

The above and other aspects, features and advantages of certain embodiments of the disclosure will be more apparent from the following detailed description, taken in conjunction with the accompanying drawings, in which:

FIG. 8 is a flow diagram illustrating a method for charging an electronic device by using a wireless charging device, according to an embodiment.

DETAILED DESCRIPTION

Hereinafter, various embodiments of the disclosure will be described in detail with reference to the accompanying drawings.

Figure 1:
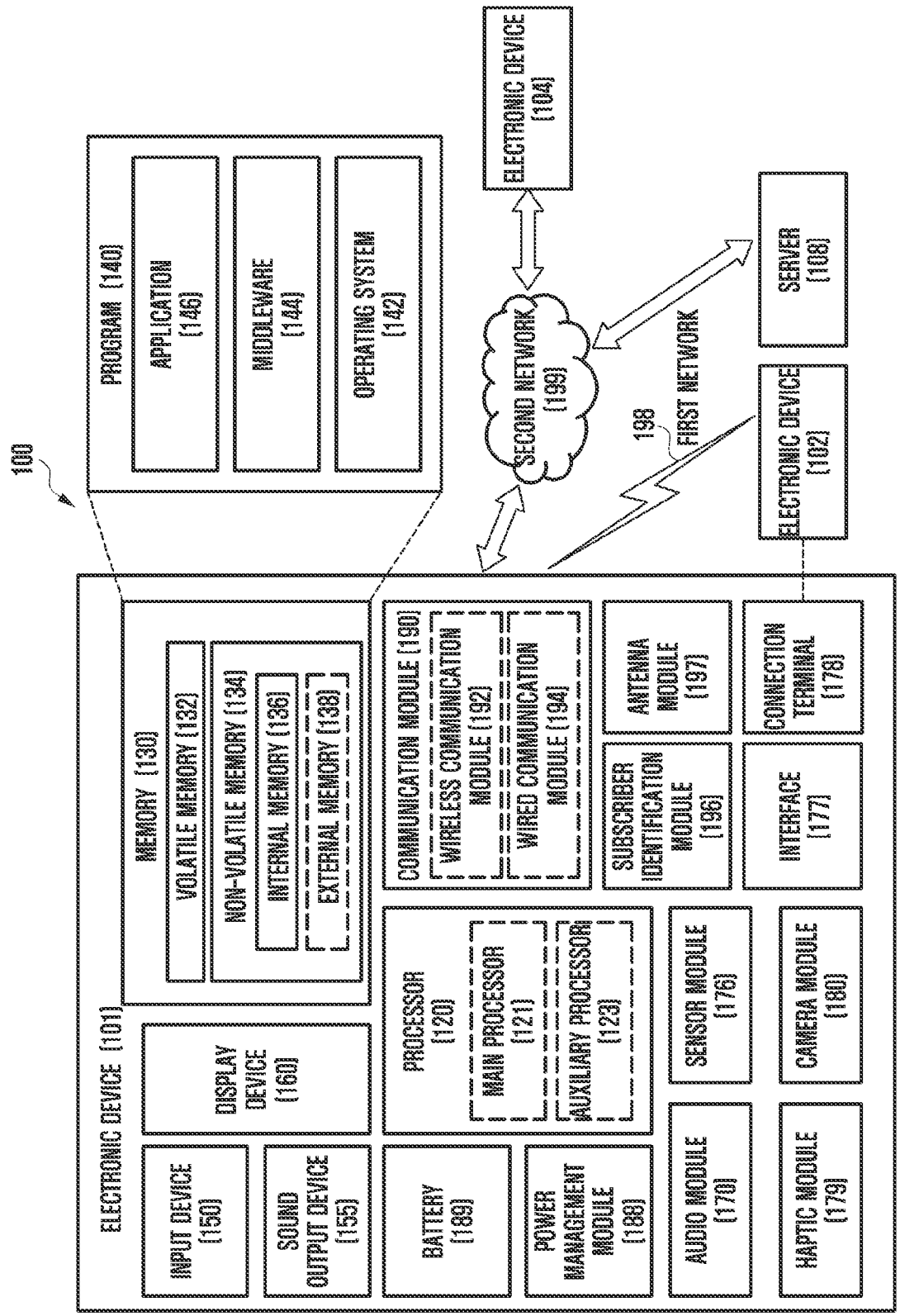
FIG. 1 is a block diagram illustrating an electronic device in a network environment, according to an embodiment.

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform certain data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store certain data used by at least one component (e.g., the processor 120 or the sensor module 176) of the electronic device 101. The certain data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These certain types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit/receive a signal or power to/from an external entity (e.g., an external electronic device). According to some embodiments, the antenna module 197 may be formed of a conductor or a conductive pattern and may further include any other component (e.g., RFIC). According to an embodiment, the antenna module 197 may include one or more antennas, which may be selected to be suitable for a communication scheme used in a specific communication network, such as the first network 198 or the second network 199 by, for example, the communication module 190. Through the selected at least one antenna, a signal or power may be transmitted or received between the communication module 190 and the external electronic device.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
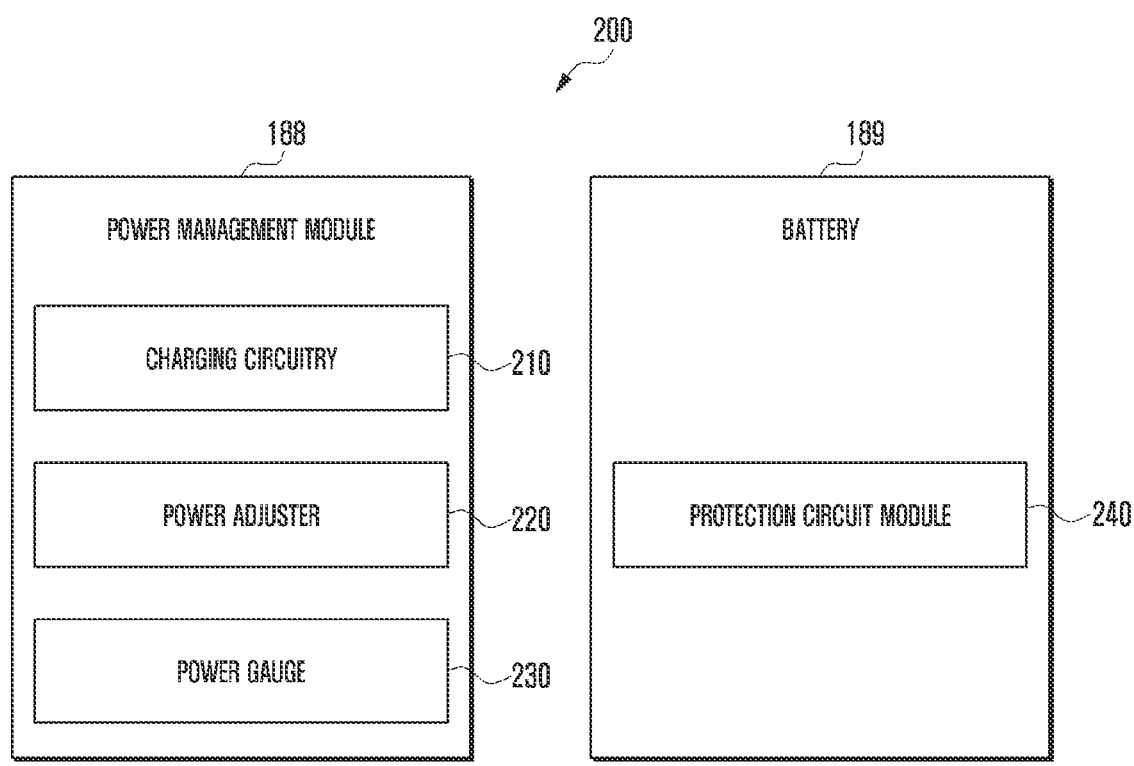
FIG. 2 is a block diagram illustrating a power management module and a battery, according to an embodiment.

FIG. 2 is a block diagram 200 illustrating the power management module 188 and the battery 189 according to various embodiments. Referring to FIG. 2, the power management module 188 may include charging circuitry 210, a power adjuster 220, or a power gauge 230. The charging circuitry 210 may charge the battery 189 by using power supplied from an external power source outside the electronic device 101. According to an embodiment, the charging circuitry 210 may select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 176, the power gauge 230, or the power management module 188. According to an embodiment, the corresponding sensor (e.g., a temperature sensor) of the sensor module 176 may be included as part of the PCM 240, or may be disposed near the battery 189 as a separate device.

The electronic device according to certain embodiments may be one of certain types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include certain changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

According to various embodiments of the disclosure, connecting an inverter to each of coil groups provided in different layers and charging an electronic device by using a plurality of coils disposed in different layers can improve a charging speed and charging efficiency.

Figure 3A:
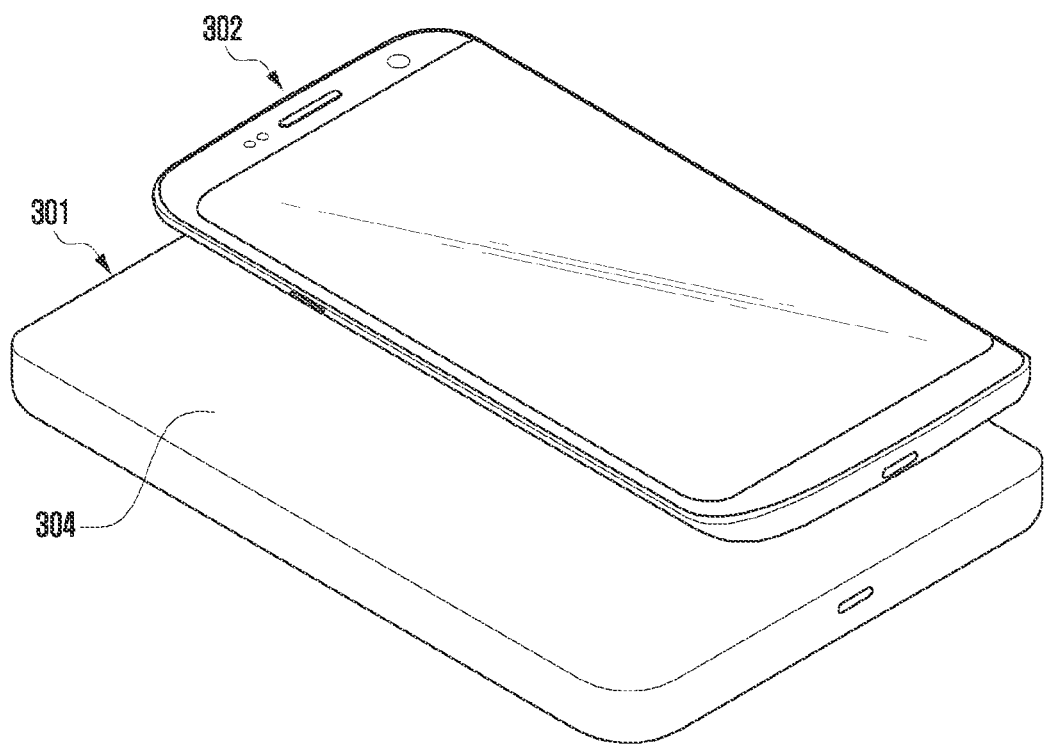
FIG. 3A is a diagram schematically illustrating a wireless charging device (i.e., a wireless charging transmitter) and an electronic device (i.e., a wireless charging receiver), according to an embodiment.

FIG. 3A is a diagram schematically illustrating a wireless charging device and an electronic device, according to an embodiment.

Referring to FIG. 3A, a wireless charging device 301 (i.e., a wireless charging transmitter) is capable of charging an electronic device 302 (i.e., a wireless charging receiver) by transmitting power wirelessly.

For example, when a battery 189 of the electronic device 302 is in a discharged state or has a low level of power, the wireless charging device 301 may transmit power wirelessly to the electronic device 302 to charge the battery 189.

The electronic device 302 of FIG. 3A may include the electronic device 101 shown in FIG. 1. The electronic device 302 may include at least one of a smart phone, a wearable device (e.g., a watch), or a wireless earphone. The wireless charging device 301 may be identical with or similar to the electronic device 302. The wireless charging device 301 may include at least one of the electronic devices 101, 102, and 104 shown in FIG. 1.

The wireless charging device 301 may determine the proximity or contact of the electronic device 302 while waiting for charging of the electronic device 302. For example, the wireless charging device 301 may transmit a ping signal to the electronic device 302 and thereby determine whether the electronic device 302 is adjacent to or in contact with the wireless charging device 301. In response to the ping signal received from the wireless charging device 301, the electronic device 302 may transmit a feedback signal (e.g., a response signal, identification information, configuration information, and/or a signal strength packet (SSP) signal) to the wireless charging device 301.

Based on the ping signal used for determining the proximity or contact of the electronic device 302, the wireless charging device 301 may determine whether there is an object (e.g., metal) placed on a housing 304 of the wireless charging device 301. For example, the wireless charging device 301 may identify a change in electric energy (e.g., current or voltage) measured when transmitting the ping signal and, based on the identified change in electric energy, determine the existence or not of the electronic device 302. When the electronic device 302 exists, the wireless charging device 301 may adjust at least some of a plurality of parameters related to the ping signal.

Above the housing 304 of the wireless charging device 301, a guide (e.g., an indicator) for a position (e.g., a coil position or a chargeable position) in which the electronic device 302 should be disposed may be displayed.

Figure 3B:
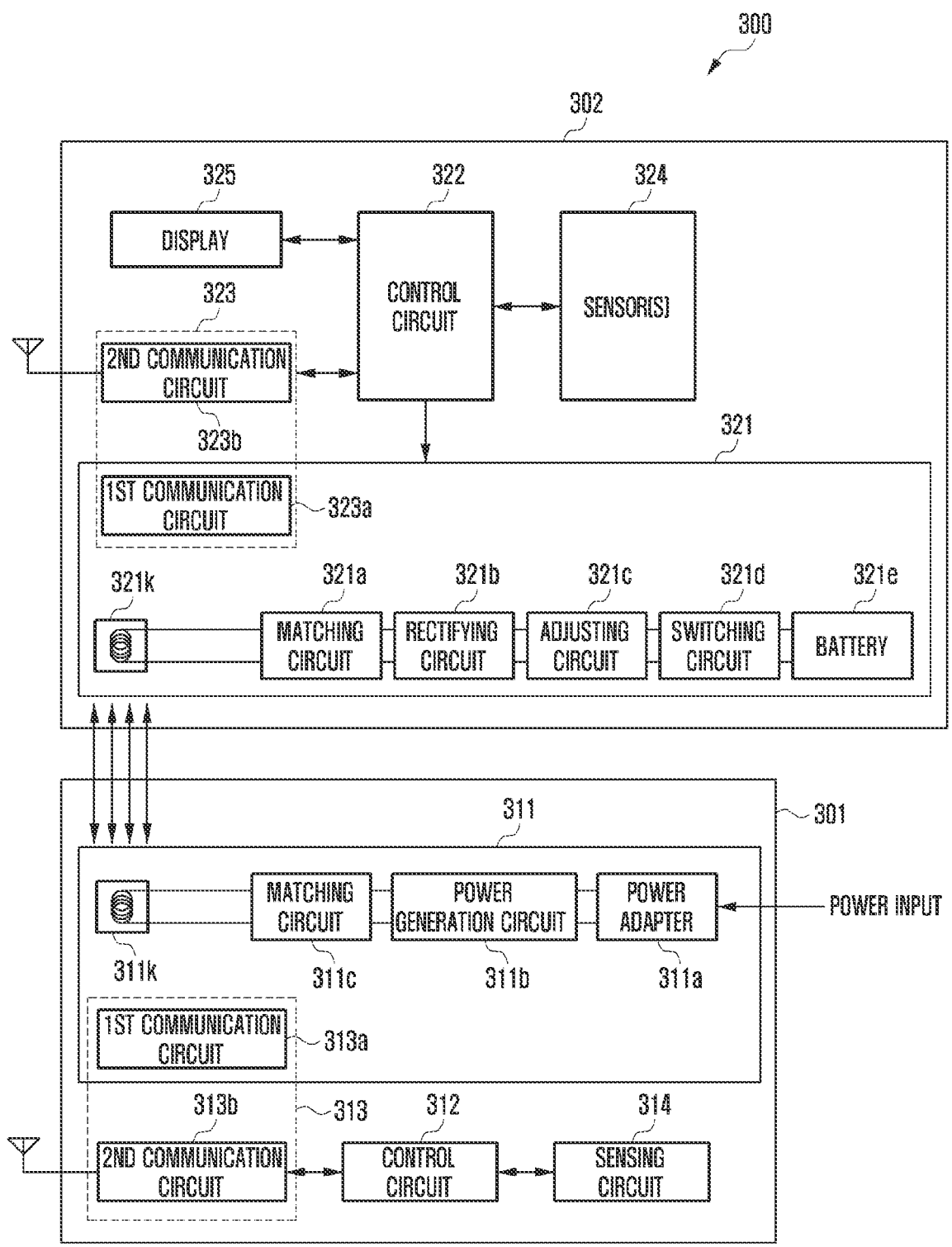
FIG. 3B is a block diagram illustrating a wireless charging environment of a wireless charging device and an electronic device, according to an embodiment.

FIG. 3B is a block diagram illustrating a wireless charging environment 300 of a wireless charging device (i.e., a wireless charging transmitter) and an electronic device (i.e., a wireless charging receiver), according to an embodiment.

A wireless charging device 301 of FIG. 3B may be the wireless charging device 301 shown in FIG. 3A. In addition, an electronic device 302 of FIG. 3B may be the electronic device 101 shown in FIG. 1 or the electronic device 302 shown in FIG. 3A.

When the electronic device 302 is disposed on a housing 304 of the wireless charging device 301, the wireless charging device 301 may transmit power wirelessly to the electronic device 302 to charge a battery 321e.

The wireless charging device 301 may include a power transmitter 311, a control circuit 312, a communication circuit 313, and/or a sensing circuit 314.

The power transmitter 311 may receive power from an external power source (e.g., a commercial power source, an auxiliary battery device, a laptop computer, a desktop computer, or a smart phone).

The power transmitter 311 may include a power adapter 311a, a power generation circuit 311b, a matching circuit 311c, and a power transmission coil 311k.

The power adapter 311a may convert a voltage of power inputted from an external power source (e.g., a travel adapter (TA)). The power generation circuit 311b may generate power required for power transmission from the converted voltage. The matching circuit 311c may maximize efficiency between the power transmission coil 311k and a power reception coil 321k of the electronic device 302.

In case of transmitting power wirelessly to a plurality of electronic devices 302, the power transmitter 311 may include a plurality of power adapters 311a, a plurality of power generation circuits 311b, a plurality of matching circuits 311c, and/or a plurality of power transmission coils 311k.

The power transmission coil 311k may include a plurality of coils grouped and disposed in different layers. Using the plurality of coils, the wireless charging device 301 may charge the electronic device 302.

The control circuit 312 may perform overall control for transmitting power through the wireless charging device 301. The control circuit 312 may be operatively connected to the power transmitter 311, the communication circuit 313, and the sensing circuit 314. The control circuit 312 may generate various messages required for wireless power transmission and transmit them to the communication circuit 313. The control circuit 312 may calculate power (or amount of power) to be transmitted to the electronic device 302, based on information received from the electronic device 302 through the communication circuit 313. The control circuit 312 may control the power transmitter 311 to transmit the calculated power to the electronic device 302 through the power transmission coil 311k.

The communication circuit 313 (e.g., the communication module 190 in FIG. 1) may include at least one of a first communication circuit 313a and a second communication circuit 313b. The first communication circuit 313a may perform communication (e.g., in-band type communication of transmitting a power signal or a communication signal by using the power transmission coil 311k) with a first communication circuit 323a of the electronic device 302, using the same frequency as, or a frequency of a band adjacent to, a frequency used for wireless power transmission by the power transmission coil 311k. The second communication circuit 313b may perform communication (e.g., out-band type communication of transmitting a communication signal by using the antenna module 197 in FIG. 1) with a second communication circuit 323b of the electronic device 302, using a frequency different from a frequency used for wireless power transmission by the power transmission coil 311k. The second communication circuit 313b may receive, from the second communication circuit 323b of the electronic device 302, information, such as information about a rectified voltage (Vrec), information about a current (Iout) flowing in the rectifying circuit, various packets, or messages, about a charging state of the electronic device 302 by using at least one of, for example, Bluetooth™, Bluetooth™ low energy, Wi-Fi, or near field communication (NFC).

The sensing circuit 314 may include at least one sensor and detect at least one state related to the wireless charging device 301 by using the at least one sensor. For example, the sensing circuit 314 may include at least one of a temperature sensor, a motion sensor, a proximity sensor, or a current (or voltage) sensor.

The temperature sensor may detect a temperature state of the wireless charging device 301. The motion sensor may detect a motion state of the wireless charging device 301. The proximity sensor may detect an object (e.g., the electronic device 302) in proximity to an upper surface of the housing 304 of the wireless charging device 301. The current (or voltage) sensor may detect an output signal state (e.g., at least one of a current level, a voltage level, or a power level) of the wireless charging device 301. The current (or voltage) sensor may measure a signal for the power transmitter 311. For example, the current (or voltage) sensor may measure a signal for at least a portion of the matching circuit 311c and the power generation circuit 311b. The current (or voltage) sensor may include a circuit for measuring a signal for a front end of the power transmission coil 311k.

The sensing circuit 314 may detect an external object (e.g., metal) existing between the wireless charging device 301 and the electronic device 302.

When the wireless charging device 301 is a mobile terminal (e.g., a smart phone), the wireless charging device 301 may include a display 160. The wireless charging device 301 may display, on the display, various kinds of information related to wireless charging, such as information about a charging state of the wireless charging device 301, information about a charging state of the electronic device 302, information about detection of the electronic device 302, or information about detection of an external object (e.g., metal).

In FIG. 3B, when the electronic device 302 is disposed above the housing 304 of the wireless charging device 301, the electronic device 302 may receive power wirelessly from the wireless charging device 301.

The electronic device 302 may include at least one of a power receiver 321, a control circuit 322, a communication circuit 323, at least one sensor 324, and a display 325. In describing components of the electronic device 302, the description of components corresponding to those of the wireless charging device 301 may be omitted.

The power receiver 321 may include at least one of a power reception coil 321k for receiving power wirelessly from the wireless charging device 301 (especially, from the power transmission coil 311k), a matching circuit 321a, a rectifying circuit 321b for rectifying received AC power to DC power, an adjusting circuit 321c for adjusting a charging voltage, a switching circuit 321d, and/or a battery 321e.

The control circuit 322 may perform overall control related to wireless power reception (or wireless charging) of the electronic device 302. The control circuit 322 may generate various kinds of messages related to wireless charging and transmit them to the communication circuit 323.

The communication circuit 323 (e.g., the communication module 190 in FIG. 1) may include at least one of a first communication circuit 323a and a second communication circuit 323b. The first communication circuit 323a may perform communication with the first communication circuit 313a of the wireless charging device 301 by using the power reception coil 321k. The second communication circuit 323b may perform communication with the second communication circuit 313b of the wireless charging device 301 by using at least one of Bluetooth™, Bluetooth™ low energy, Wi-Fi, or near field communication (NFC).

The sensor(s) 324 may include at least one of a current (or voltage) sensor, a temperature sensor, a proximity sensor, an illuminance sensor, or an acceleration sensor.

The display 325 may display various kinds of information related to wireless power reception (or wireless charging).

Figure 3C:
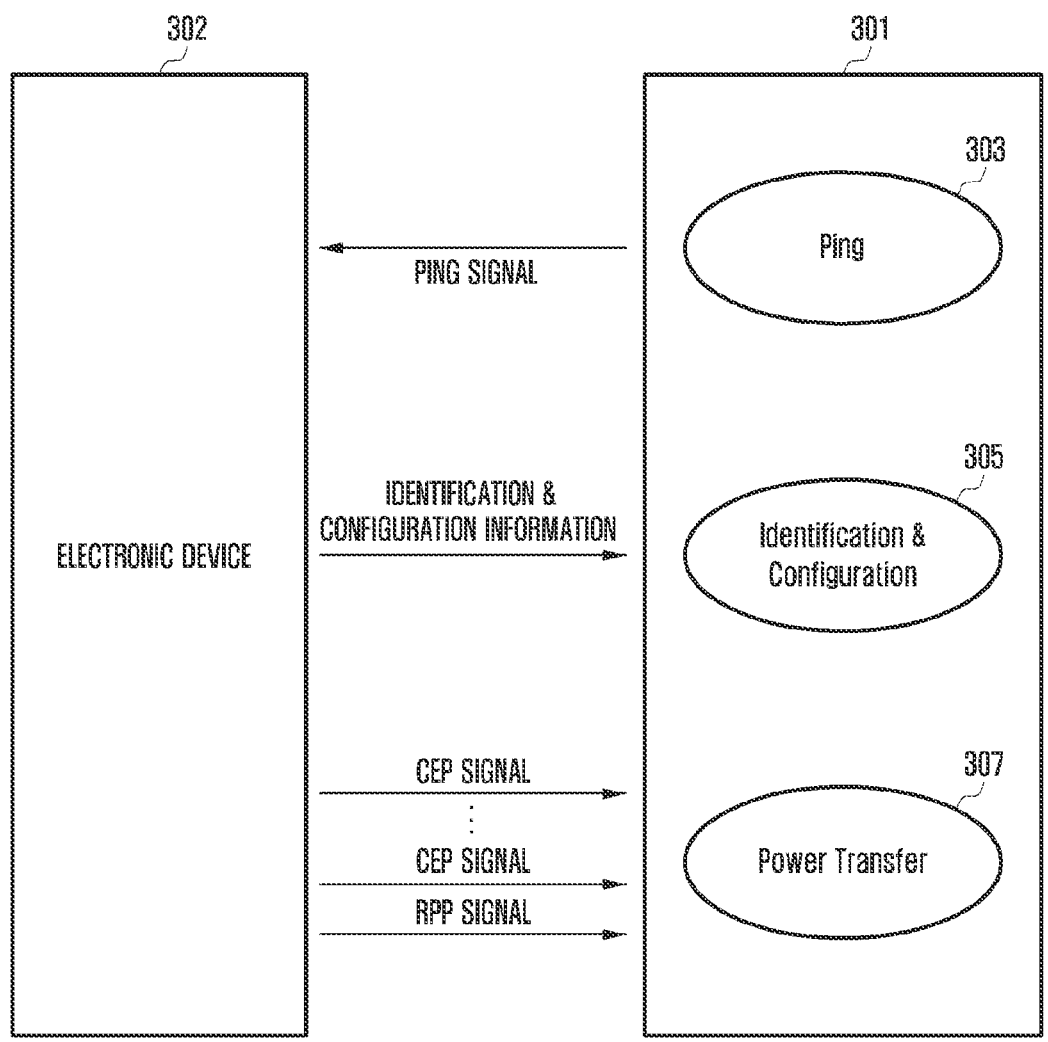
FIG. 3C is a diagram illustrating operations of a wireless charging device to detect an object of an electronic device, according to an embodiment.

FIG. 3C is a diagram illustrating operations of a wireless charging device (e.g., a wireless charging transmitter) to detect an object (e.g., metal) of an electronic device (e.g., a wireless charging receiver) according to an embodiment.

Referring to FIG. 3C, the wireless charging device 301 may perform a function (e.g., a Tx function) of wirelessly transmitting power to the electronic device 302.

When the electronic device 302 is disposed above the housing 304 shown in FIG. 3A, the wireless charging device 301 may detect and identify the electronic device 302 and then wirelessly transmit power to the electronic device 302.

The wireless charging device 301 may perform a ping operation 303, an identification and configuration operation 305, and a power transfer operation 307. In addition, the wireless charging device 301 may transmit and receive at least one signal or data by using the ping operation 303, the identification and configuration operation 305, and the power transfer operation 307.

Using the ping operation 303, a control circuit 312 of the wireless charging device 301 may transmit a ping signal in a digital or analog form to the electronic device 302. The wireless charging device 301 may receive a feedback signal (e.g., a response signal, identification information, configuration information, and/or SSP signal) in response to the ping signal from the electronic device 302, and detect whether the electronic device 302 exists.

In the ping operation 303, the control circuit 312 of the wireless charging device 301 may set a plurality of parameters related to transmission of the ping signal. For example, the control circuit 312 of the wireless charging device 301 may set a plurality of parameters related to at least one of a frequency of the ping signal, a voltage applied to a power transmission circuit (e.g., the power transmitter 311 or the power transmission coil 311k) to transmit the ping signal, or a transmission period of the ping signal. The plurality of parameters may be provided as default values in the initial setting of the wireless charging device 301.

In the ping operation 303, the control circuit 312 of the wireless charging device 301 may determine whether there is an object (e.g., metal) above the wireless charging device 301. The control circuit 312 of the wireless charging device 301 may transmit a ping signal based on a plurality of parameters related to transmission of the ping signal during an operation period (or a wireless charging standby state) related to the ping operation 303, and identify electric energy (e.g., at least one of current and voltage) measured by the power transmitter 311 (or the power transmission coil 311k) in response to the ping signal transmission.

The control circuit 312 of the wireless charging device 301 may identify at least one of a relationship between a voltage measured by the power transmitter 311 (or the power transmission coil 311k) in response to the ping signal transmission and a predetermined threshold voltage or a relationship between a current measured by the power transmitter 311 (or the power transmission coil 311k) and a predetermined threshold current, and determine the existence or not of an object above the wireless charging device 301, based on the identifying result.

The control circuit 312 of the wireless charging device 301 may detect a state of an object (e.g., the type of the object, the size of the object, or the arrangement of the object), or a change in such a state, existing above the wireless charging device 301, based on a change in electric energy (e.g., at least one of current and voltage) measured by the power transmitter 311 (or the power transmission coil 311k) in response to the ping signal transmission.

When there is an object (e.g., metal) above the wireless charging device 301, the control circuit 312 of the wireless charging device 301 may change or adjust at least some of the plurality of parameters related to transmission of the ping signal so as to suppress noise due to the object (e.g., vibration of the object and/or noise in the audible frequency band due to such vibration), heat generation of the object, or the deterioration of the wireless charging device 301 caused by the object (e.g., heat generation of the wireless charging device 301 caused by induction heating from the object). The control circuit 312 of the wireless charging device 301 may output a specified notification (e.g., light emission, vibration, or sound) in order to provide a notification about the existence of the object.

Upon detecting the electronic device 302 (i.e., a wireless charging receiver), the control circuit 312 of the wireless charging device 301 may receive identification information and configuration information of the electronic device 302 in the identification and configuration operation 305.

The identification information may include at least one kind of information (e.g., a wireless communication ID of the electronic device 302) for identifying the electronic device 302. When the identification information is identical with information (e.g., a wireless communication ID of the electronic device 302 for which wireless power sharing with the wireless charging device 301 is authenticated) previously stored in a memory 130, the control circuit 312 of the wireless charging device 301 may determine the detected electronic device 302 as a valid device. The configuration information may include various kinds of information required for the electronic device 302 to receive power wirelessly from the wireless charging device 301.

As the electronic device 302 is authenticated based on the identification information and the configuration information, the control circuit 312 of the wireless charging device 301 may wirelessly transmit power to the electronic device 302 in the power transfer operation 307. In the power transfer operation 307, the control circuit 312 of the wireless charging device 301 may receive, from the electronic device 302, at least one control error packet (CEP) signal having notification information about power (or amount of power) required by the electronic device 302 for charging, and/or a received power packet (RPP) signal having size information about power (or amount of power) received by the electronic device 302. The control circuit 312 of the wireless charging device 301 may adjust power wirelessly transmitted to the electronic device 302, based on the at least one CEP signal and/or the RPP signal. According to an embodiment, the electronic device 302 may transmit the at least one CEP signal and/or the RPP signal at regular time intervals or when a specific event (e.g., a state change of the electronic device 302) occurs. The at least one CEP signal and the RRP signal may be transmitted at different time intervals.

Figure 4:
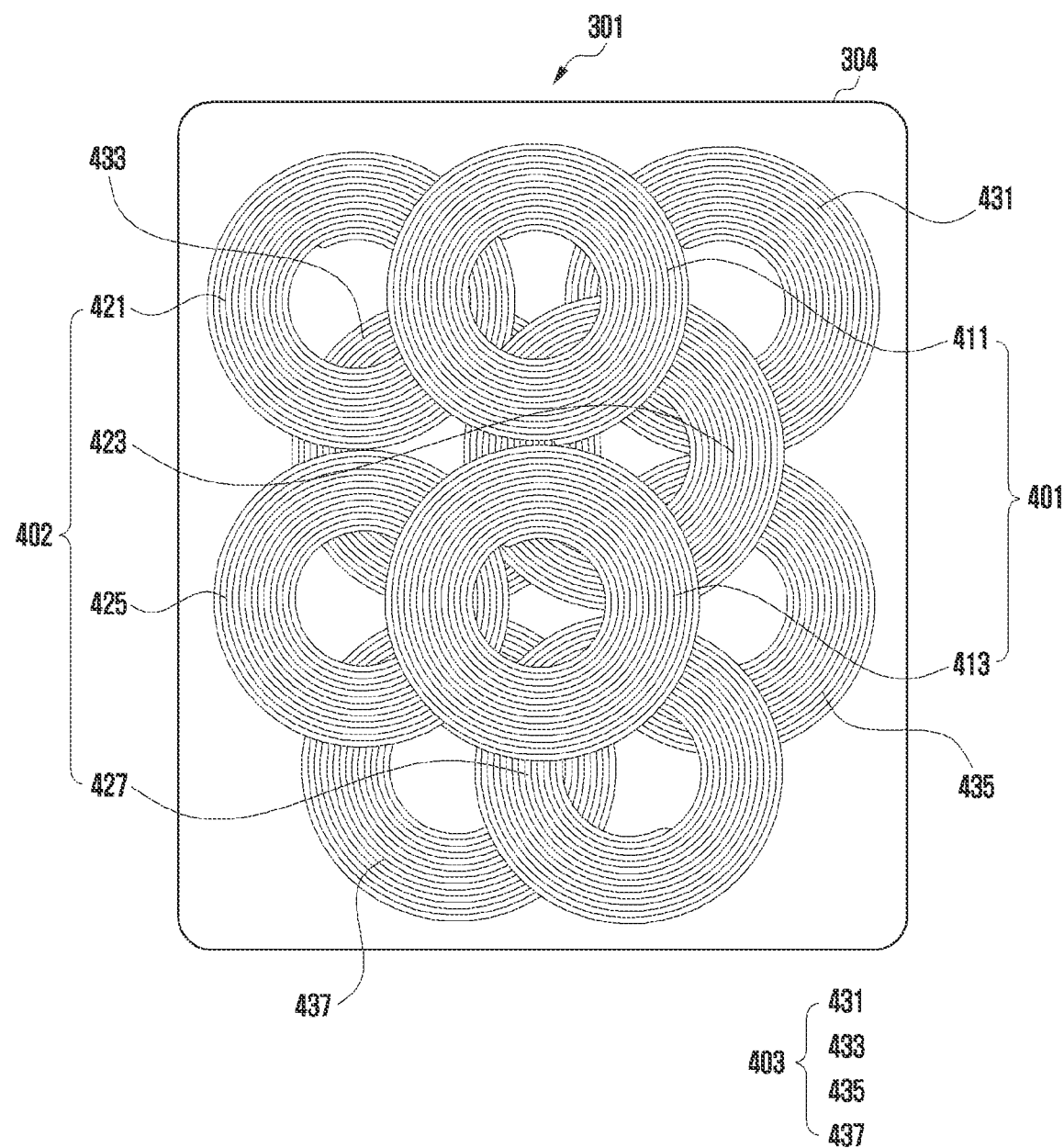
FIG. 4 is a diagram illustrating a configuration of a plurality of coils provided in a wireless charging device, according to an embodiment.

FIG. 4 is a diagram illustrating a configuration of a plurality of coils provided in a wireless charging device according to an embodiment.

Referring to FIG. 4, a wireless charging device 301 (i.e., a wireless charging transmitter) may include a first group of coils 401 (hereinafter, a first coil group), a second group of coils 402 (hereinafter, a second coil group), and/or a third group of coils 403 (hereinafter, a third coil group) within a housing 304.

Each of the first coil group 401, the second coil group 402, and the third coil group 403 may include the power transmission coil 311k shown in FIG. 3B. The first coil group 401, the second coil group 402, and the third coil group 403 may be disposed in different layers.

Each of the first coil group 401, the second coil group 402, and the third coil group 403 may be formed of one layer. Alternatively, each of the first coil group 401, the second coil group 402, and the third coil group 403 may be formed of a plurality of layers instead of one layer.

The first coil group 401 may be disposed in a first layer (e.g., an upper layer) above the second coil group 402. The first coil group 401 may include a plurality of coils. For example, the first coil group 401 may include a first coil 411 and a second coil 413. The first coil 411 and the second coil 413 may be disposed in the same layer or different layers.

The second coil group 402 may be disposed in a second layer (e.g., an intermediate layer) under the first coil group 401. The second coil group 402 may include a plurality of coils. The second coil group 402 may include a third coil 421, a fourth coil 423, a fifth coil 425, and a sixth coil 427. The third coil 421, the fourth coil 423, the fifth coil 425, and the sixth coil 427 may be disposed in the same layer or different layers.

The third coil group 403 may be disposed in a third layer (e.g., a lower layer) under the second coil group 403. The third coil group 403 may include a plurality of coils. The third coil group 403 may include a seventh coil 431, an eighth coil 433, a ninth coil 435, and a tenth coil 437. The seventh coil 431, the eighth coil 433, the ninth coil 435, and the tenth coil 437 may be disposed in the same layer or different layers.

A central axis of each of the first coil 411 and the second coil 413 in the first coil group 401 disposed in the first layer may not coincide with a central axis of each of the third coil 421, the fourth coil 423, the fifth coil 425, and the sixth coil 427 in the second coil group 402 disposed in the second layer.

A central axis of each of the third coil 421, the fourth coil 423, the fifth coil 425, and the sixth coil 427 in the second coil group 402 disposed in the second layer may not coincide with a central axis of each of the seventh coil 431, the eighth coil 433, the ninth coil 435, and the tenth coil 437 in the third coil group 403 disposed in the third layer.

A central axis of each of the first coil 411 and the second coil 413 in the first coil group 401 disposed in the first layer may not coincide with a central axis of each of the seventh coil 431, the eighth coil 433, the ninth coil 435, and the tenth coil 437 in the third coil group 403 disposed in the third layer.

Although coil grouping is described using the first coil group 401 to the third coil group 403 respectively formed in the first layer to the third layer, this is only an example and is not to be construed as a limitation. In one example, a grouping may be formed with coils included in the first coil group 401 disposed in the first layer. In another example, a grouping may be formed with coils included in the second coil group 402 and the third coil group 403 respectively disposed in the second layer and the third layer.

That is, in the wireless charging device 301 as shown in FIG. 4, the number of coil groups, the number of layers for coil grouping, and the number of coils included in each coil group are not limited to the examples described herein.

Figure 5:
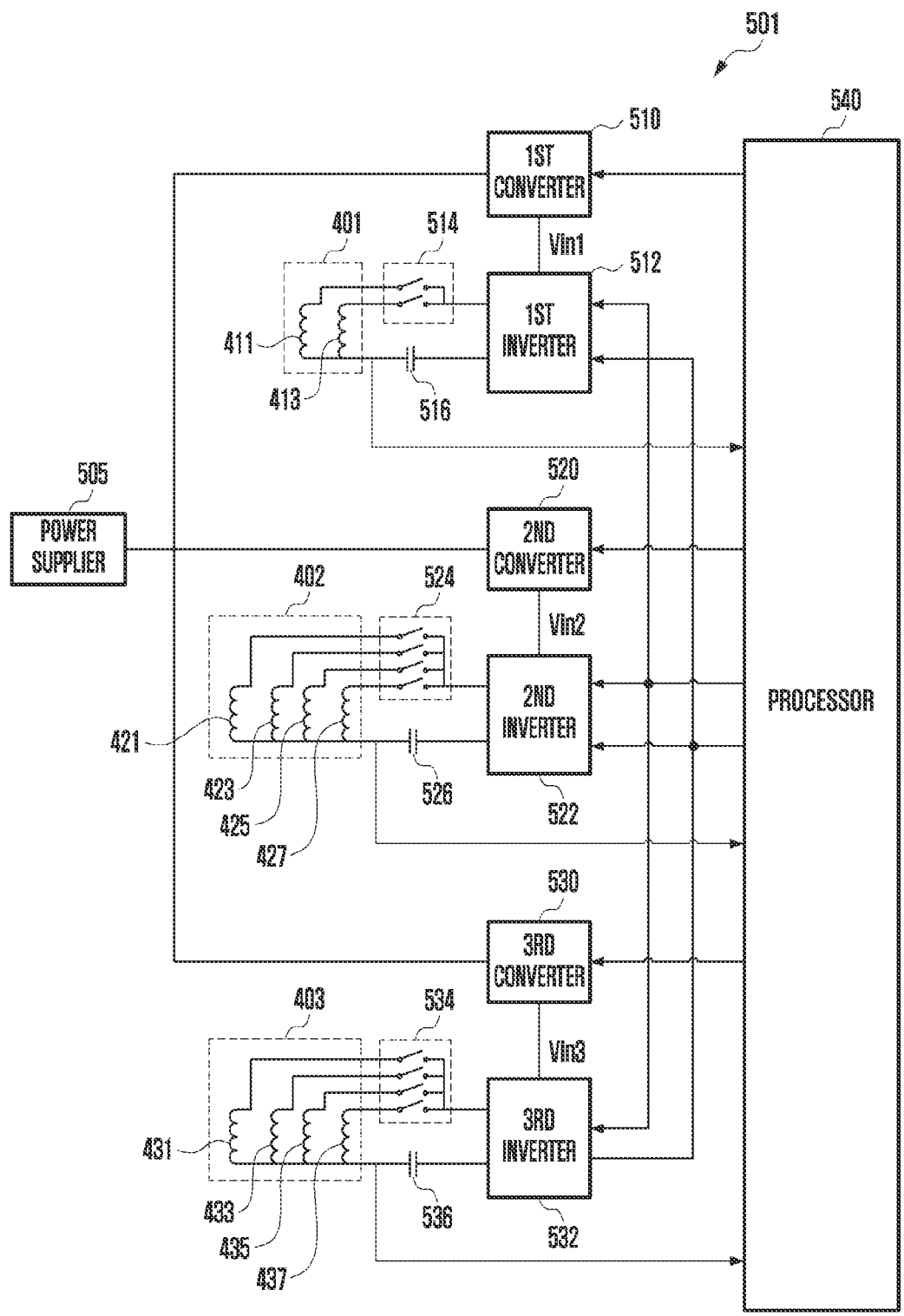
FIG. 5 is a circuit diagram schematically illustrating a configuration of a wireless charging device, according to an embodiment.

FIG. 5 is a circuit diagram schematically illustrating a configuration of a wireless charging device, according to an embodiment.

The wireless charging device 501 may include a first converter 510, a first inverter 512, a first switch 514, a first coil group 401, a first resonant element 516, a second converter 520, a second inverter 522, a second switch 524, a second coil group 402, a second resonant element 526, a third converter 530, a third inverter 532, a third switch 534, a third coil group 403, a third resonant element 536, and/or a processor 540.

Referring to FIG. 5, the wireless charging device 501 may receive power from a power supplier 505 (also referred to as a power supply or power source) that resides outside.

The wireless charging device 501 may be the wireless charging device 301 described above and shown in FIGS. 3A, 3B, 3C, and/or 4.

The power supplier 505 may supply power to the wireless charging device 501 through a travel adapter (TA) or a universal serial bus (USB). The power supplier 505 may supply power by converting alternating current (AC) power into direct current (DC) power.

The first converter 510 (e.g., the power adapter 311a in FIG. 3B) may be electrically connected to the power supplier 505. The first converter 510 may convert DC power, inputted from the power supplier 505, into predetermined power. For example, the first converter 510 may convert a voltage so that an output voltage becomes about 5V.

The first inverter 512 (e.g., the power generation circuit 311b in FIG. 3B) may be electrically connected to the first converter 510. The first inverter 512 may convert a DC voltage, inputted from the first converter 510, into an AC voltage.

The first inverter 512 may include an amplifier. When the voltage inputted from the first converter 510 is less than a predetermined gain, the first inverter 512 may amplify the voltage to the predetermined gain by using the amplifier.

The first switch 514 may be electrically connected to the first inverter 512. The first switch 514 may form contacts between the first inverter 512 and the first coil group 401. The first switch 514 may selectively connect the first coil 411 or the second coil 413 in the first coil group 401 to the first inverter 512 under the control of the processor 540. In addition, the first switch 514 may switch between an on-state and an off-state under the control of the processor 540.

The first coil group 401 including the first coil 411 and the second coil 413 may be connected to the first inverter 512 through the first switch 514. That is, one of the first coil 411 and the second coil 413 may be selectively connected to the first inverter 512 under the control of the processor 540 and the ON or OFF operation of the first switch 514. One of the first coil 411 and the second coil 413 may form an electromagnetic field by AC signals transmitted through the first inverter 512 under the control of the processor 540, thereby transmitting power wirelessly to the electronic device 302 (i.e., a wireless charging receiver).

The first resonant element 516 may be provided between the first inverter 512 and the first coil group 401. The first resonant element 516 may comprise a capacitor. The first resonant element 516 may maximize the efficiency of the first coil group 401. The first resonant element 516 may perform a function of causing a voltage outputted to the electronic device 302 through the first coil group 401 to be high voltage with high efficiency.

The second converter 520 (e.g., the power adapter 311a in FIG. 3B) may be electrically connected to the power supplier 505. The second converter 520 may convert DC power, inputted from the power supplier 505, into predetermined power. For example, the second converter 520 may convert a voltage so that an output voltage becomes about 5V.

The second inverter 522 (e.g., the power generation circuit 311b in FIG. 3B) may be electrically connected to the second converter 520. The second inverter 522 may convert a DC voltage, inputted from the second converter 520, into an AC voltage.

The second inverter 522 may include an amplifier. When the voltage inputted from the second converter 520 is less than a predetermined gain, the second inverter 522 may amplify the voltage to the predetermined gain by using the amplifier.

The second switch 524 may be electrically connected to the second inverter 522. The second switch 524 may form contacts between the second inverter 522 and the second coil group 402. The second switch 524 may selectively connect the third coil 421, the fourth coil 423, the fifth coil 425, or the sixth coil 427 in the second coil group 402 to the second inverter 522 under the control of the processor 540. In addition, the second switch 524 may switch between an on-state and an off-state under the control of the processor 540.

The second coil group 402 including the third coil 421, the fourth coil 423, the fifth coil 425, and the sixth coil 427 may be connected to the second inverter 522 through the second switch 524. That is, one of the third coil 421, the fourth coil 423, the fifth coil 425, and the sixth coil 427 may be selectively connected to the second inverter 522 under the control of the processor 540 and the ON or OFF operation of the second switch 524. One of the third coil 421, the fourth coil 423, the fifth coil 425, and the sixth coil 427 may form an electromagnetic field by AC signals transmitted through the second inverter 522 under the control of the processor 540, thereby transmitting power wirelessly to the electronic device 302 (i.e., a wireless charging receiver).

The second resonant element 526 may be provided between the second inverter 522 and the second coil group 402. The second resonant element 526 may comprise a capacitor. The second resonant element 526 may maximize the efficiency of the second coil group 402. The second resonant element 526 may perform a function of causing a voltage outputted to the electronic device 302 through the second coil group 402 to be high voltage with high efficiency.

The third converter 530 (e.g., the power adapter 311a in FIG. 3B) may be electrically connected to the power supplier 505. The third converter 530 may convert DC power, inputted from the power supplier 505, into predetermined power. For example, the third converter 530 may convert a voltage so that an output voltage becomes about 5V.

The third inverter 532 (e.g., the power generation circuit 311b in FIG. 3B) may be electrically connected to the third converter 530. The third inverter 532 may convert a DC voltage, inputted from the third converter 530, into an AC voltage.

The third inverter 532 may include an amplifier. When the voltage inputted from the third converter 530 is less than a predetermined gain, the third inverter 532 may amplify the voltage to the predetermined gain by using the amplifier.

The third switch 534 may be electrically connected to the third inverter 532. The third switch 534 may form contacts between the third inverter 532 and the third coil group 403. The third switch 534 may selectively connect the seventh coil 431, the eighth coil 433, the ninth coil 435, or the tenth coil 437 in the third coil group 403 to the third inverter 532 under the control of the processor 540. In addition, the third switch 534 may switch between an on-state and an off-state under the control of the processor 540.

The third coil group 403 including the seventh coil 431, the eighth coil 433, the ninth coil 435, and the tenth coil 437 may be connected to the third inverter 532 through the third switch 534. That is, one of the seventh coil 431, the eighth coil 433, the ninth coil 435, and the tenth coil 437 may be selectively connected to the third inverter 532 under the control of the processor 540 and the ON or OFF operation of the third switch 524. One of the seventh coil 431, the eighth coil 433, the ninth coil 435, and the tenth coil 437 may form an electromagnetic field by AC signals transmitted through the third inverter 532 under the control of the processor 540, thereby transmitting power wirelessly to the electronic device 302 (i.e., a wireless charging receiver).

The third resonant element 536 may be provided between the third inverter 532 and the third coil group 403. The third resonant element 536 may comprise a capacitor. The third resonant element 536 may maximize the efficiency of the third coil group 403. The third resonant element 536 may perform a function of causing a voltage outputted to the electronic device 302 through the third coil group 403 to be high voltage with high efficiency.

The processor 540 (e.g., the control circuit 312 in FIG. 3B) may be operatively connected to the first converter 510, the first inverter 512, the first switch 514, the first coil group 401, the first resonant element 516, the second converter 520, the second inverter 522, the second switch 524, the second coil group 402, the second resonant element 526, the third converter 530, the third inverter 532, the third switch 534, the third coil group 403, and/or the third resonant element 536. The processor 540 may perform overall control of the wireless charging device 501.

When the electronic device 302 is adjacent to or in contact with an upper surface of a housing 304 of the wireless charging device 501, the processor 540 may charge the electronic device 302 through two coil groups selected from among the first coil group 401, the second coil group 402, and the third coil group 403.

When the electronic device 302 is disposed above (i.e., adjacent to or in contact with) the housing 304 of the wireless charging device 501, the processor 540 may charge the electronic device 302 by using one coil (e.g., the first coil 411 or the second coil 413) in the first coil group 401 and one coil (e.g., the third coil 421, the fourth coil 423, the fifth coil 425, or the sixth coil 427) in the second coil group 402.

When the electronic device 302 is disposed above (i.e., adjacent to or in contact with) the housing 304 of the wireless charging device 501, the processor 540 may charge the electronic device 302 by using one coil (e.g., the first coil 411 or the second coil 413) in the first coil group 401, one coil (e.g., the third coil 421, the fourth coil 423, the fifth coil 425, or the sixth coil 427) in the second coil group 402, and one coil (e.g., the seventh coil 431, the eighth coil 433, the ninth coil 435, or the tenth coil 437) in the third coil group 403.

The processor 540 may generate various kinds of messages required to wirelessly transmit power to the electronic device 302. In addition, the processor 540 may calculate power or an amount of power to be transmitted to the electronic device 302.

When the electronic device 302 is adjacent to or in contact with the wireless charging device 501, the processor 540 may transmit a ping signal to the electronic device 302 through each of the first coil group 401, the second coil group 402, and the third coil group 403. Then, upon receiving a feedback signal (e.g., signal strength packet (SSP)) returned through each of the first coil group 401, the second coil group 402, and the third coil group 403, the processor 540 may identify the position of the electronic device 302.

In order to detect that the electronic device 302 is adjacent to or in contact with the upper surface of the housing 304 of the wireless charging device 501, the wireless charging device 501 may measure an impedance change amount of each of the first coil group 401, the second coil group 402, and the third coil group 403 in a predetermined time period or in a predetermined measuring pattern.

The ping signal may be periodically transmitted to the electronic device 302 with a certain strength for a certain time. The SSP may contain a predetermined signal having information about voltage strength.

The processor 540 may selectively turn on the first switch 514 connected to the first inverter 512, the second switch 524 connected to the second inverter 522, and/or the third switch 534 connected to the third inverter 532, based on a feedback signal returned from the electronic device 302, and also select coils to be operated from among a plurality of coils disposed in respective layers. For example, the plurality of coils may include one coil in the first coil group 401 disposed in a first layer (e.g., an upper layer), one coil in the second coil group 402 disposed in a second layer (e.g., an intermediate layer), and one coil in the third coil group 403 disposed in a third layer (e.g., a lower layer).

Based on the feedback signal (e.g., SSP), the processor 540 may select, as an operating coil, a coil having the largest value from among SSP values. In addition, the processor 540 may further determine the operating coil in consideration of a ratio of SSP value of each remaining coil to the largest SSP value.

The processor 540 may determine operating voltages of the first inverter 512, the second inverter 522, and the third inverter 532 respectively connected to one operating coil in the first coil group 401, one operating coil in the second coil group 402, and one operating coil in the third coil group 403 through the first switch 514, the second switch 524, and the third switch 534. The processor 540 may control pulse width modulation (PWM) signals of the first inverter 512, the second inverter 522, and the third inverter 532 to be synchronized with each other or operated independently. The processor 540 may operate, in the same phase or in different phases, the first inverter 512, the second inverter 522, and the third inverter 532 respectively connected to one coil in the first coil group 401, one coil in the second coil group 402, and one coil in the third coil group 403 through the first switch 514, the second switch 524, and the third switch 534.

The processor 540 may control the first inverter 512, the second inverter 522, and/or the third inverter 532 to generate signals in different frequency bands. In addition, the processor 540 may control the first coil group 401, the second coil group 402, and/or the third coil group 403 to wirelessly transmit different levels of power to the electronic device 302. The processor 540 may control to supply the same voltage or different voltages to the first inverter 512, the second inverter 522, and the third inverter 532. In addition, the processor 540 may reset the ratio or offset of voltages respectively supplied to the first inverter 512, the second inverter 522, and the third inverter 532, based on the values of currents supplied to the respective inverters.

Based on the feedback signal (e.g., SSP), the processor 540 may set parameters (e.g., at least one of frequency, phase, and voltage) respectively applied to the first coil group 401, the second coil group 402, and the third coil group 403 differently through the first inverter 512, the second inverter 522, and the third inverter 532.

The first coil group 401 (e.g., the first coil 411 and/or the second coil 413), the second coil group 402 (e.g., the third coil 421, the fourth coil 423, the fifth coil 425, and/or the sixth coil 427), and the third coil group 403 (e.g., the seventh coil 431, the eighth coil 433, the ninth coil 435, and/or the tenth coil 437) may have the same characteristics or have at least one different characteristic.

For example, the characteristics of the coil may include a diameter (e.g., an inner diameter or an outer diameter), a thickness, the number of turns, the number of layers, and/or a coil wound direction.

According to an embodiment, a wireless charging device (i.e., a wireless charging transmitter) may include a first inverter, a first switch electrically connected to the first inverter, a second inverter, a second switch electrically connected to the second inverter, a first coil group connected to the first inverter through the first switch, a second coil group connected to the second inverter through the second switch, and a processor operatively connected to the first inverter, the first switch, the second inverter, the second switch, the first coil group, and the second coil group. The processor may be configured to detect an electronic device disposed above the wireless charging device through at least one coil in the first coil group or the second coil group, and to wirelessly transmit power to the electronic device by using one coil (e.g., a first coil or a second coil) in the first coil group and one coil (e.g., one of a third coil, a fourth coil, a fifth coil, and a sixth coil) in the second coil group.

The first coil group and the second coil group may be disposed in different layers.

A central axis of each of a plurality of coils included in the first coil group may not coincide with a central axis of each of a plurality of coils included in the second coil group.

The wireless charging device may further include a first converter for supplying direct current (DC) power to the first inverter, and a second converter for supplying DC power to the second inverter.

The wireless charging device 501 may further include a first resonant element provided between the first inverter and the first coil group, and a second resonant element provided between the second inverter and the second coil group.

The wireless charging device may further include a third inverter, a third switch electrically connected to the third inverter, and a third coil group connected to the third inverter through the third switch, and the processor may be configured to detect the electronic device disposed above the wireless charging device through at least one coil in the first coil group, the second coil group, or the third coil group, and to wirelessly transmit power to the electronic device by using one coil in the first coil group, one coil in the second coil group, and one coil in the third coil group.

The processor may be configured to transmit a ping signal to the electronic device through each of the first coil group and the second coil group when the electronic device is detected, and to identify a position of the electronic device through a feedback signal (e.g., an SSP signal) returned from the electronic device.

The feedback signal may include a signal strength packet (SSP) signal, and the processor may be configured to select, as operating coils, a coil having a largest value of the SSP signal in the first coil group and a coil having a largest value of the SSP signal in the second coil group.

The processor may be configured to supply a same voltage or different voltages to the first inverter connected to the first coil group and the second inverter connected to the second coil group.

The processor may be configured to control the first inverter connected to the first coil group and the second inverter connected to the second coil group to operate in a same phase or in different phases.

Figure 6:
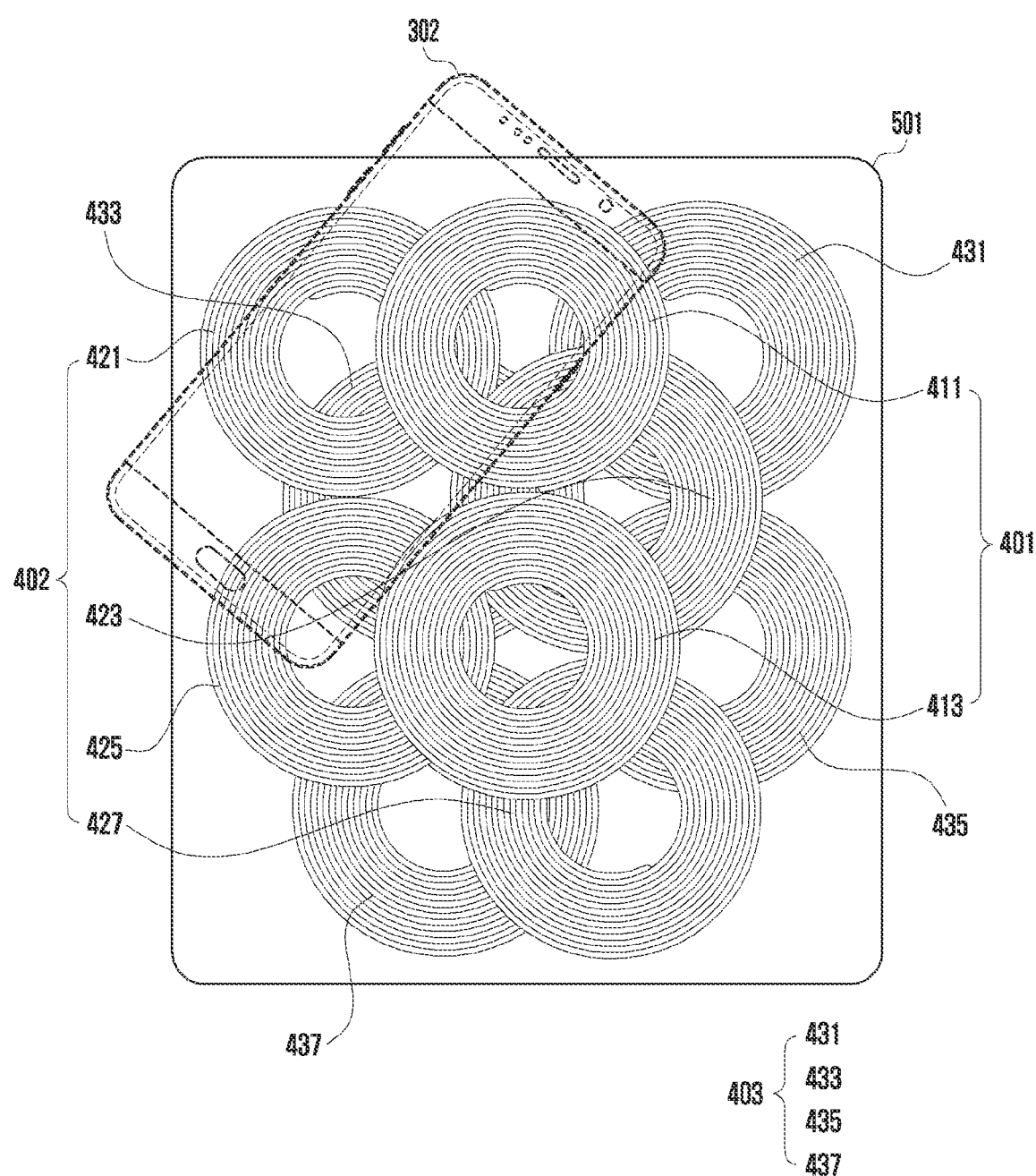
FIG. 6 is a diagram illustrating a charging operation when an electronic device is disposed above a wireless charging device, according to an embodiment.

FIG. 6 is a diagram illustrating a charging operation when an electronic device (e.g., a smart phone) is disposed above a wireless charging device, according to an embodiment.

Referring to FIG. 6, for charging, the electronic device 302 (i.e., a wireless charging receiver) may be disposed above a housing 304 of the wireless charging device 501 (i.e., a wireless charging transmitter). The electronic device 302 may comprise a smart phone.

As shown, the electronic device 302 may be disposed above the first coil 411 of the first coil group 401 disposed in the first layer (e.g., an upper layer) of the wireless charging device 501, above the third coil 421 of the second coil group 402 disposed in the second layer (e.g., an intermediate layer), and above the eighth coil 433 of the third coil group 403 disposed in the third layer (e.g., a lower layer).

The processor 540 of the wireless charging device 501 may transmit a ping signal to the electronic device 302 through each of the first coil group 401, the second coil group 402, and the third coil group 403.

The processor 540 of the wireless charging device 501 may identify the position of the electronic device 302, based on a feedback signal (e.g., signal strength packet (SSP)) received through each of the first coil group 401, the second coil group 402, and the third coil group 403. For example, the processor 540 of the wireless charging device 501 may receive the feedback signal (e.g., SSP) having a predetermined value or more through the first coil 411 of the first coil group 401, the third coil 421 of the second coil group 402, and the eighth coil 433 of the third coil group 403 above which the electronic device 302 is disposed. Then, based on the received feedback signal, the processor 540 may identify the position of the electronic device 302.

The processor 540 of the wireless charging device 501 may connect the first inverter 512 and the first coil 411 of the first coil group 401 through the first switch 514, connect the second inverter 522 and the third coil 421 of the second coil group 402 through the second switch 524, and connect the third inverter 532 and the eighth coil 433 of the third coil group 403 through the third switch 534.

Using the first coil 411 of the first coil group 401, the third coil 421 of the second coil group 402, and the eighth coil 433 of the third coil group 403, the processor 540 of the wireless charging device 501 may output a charging voltage to the electronic device 302 and thereby perform wireless charging.

Figure 7:
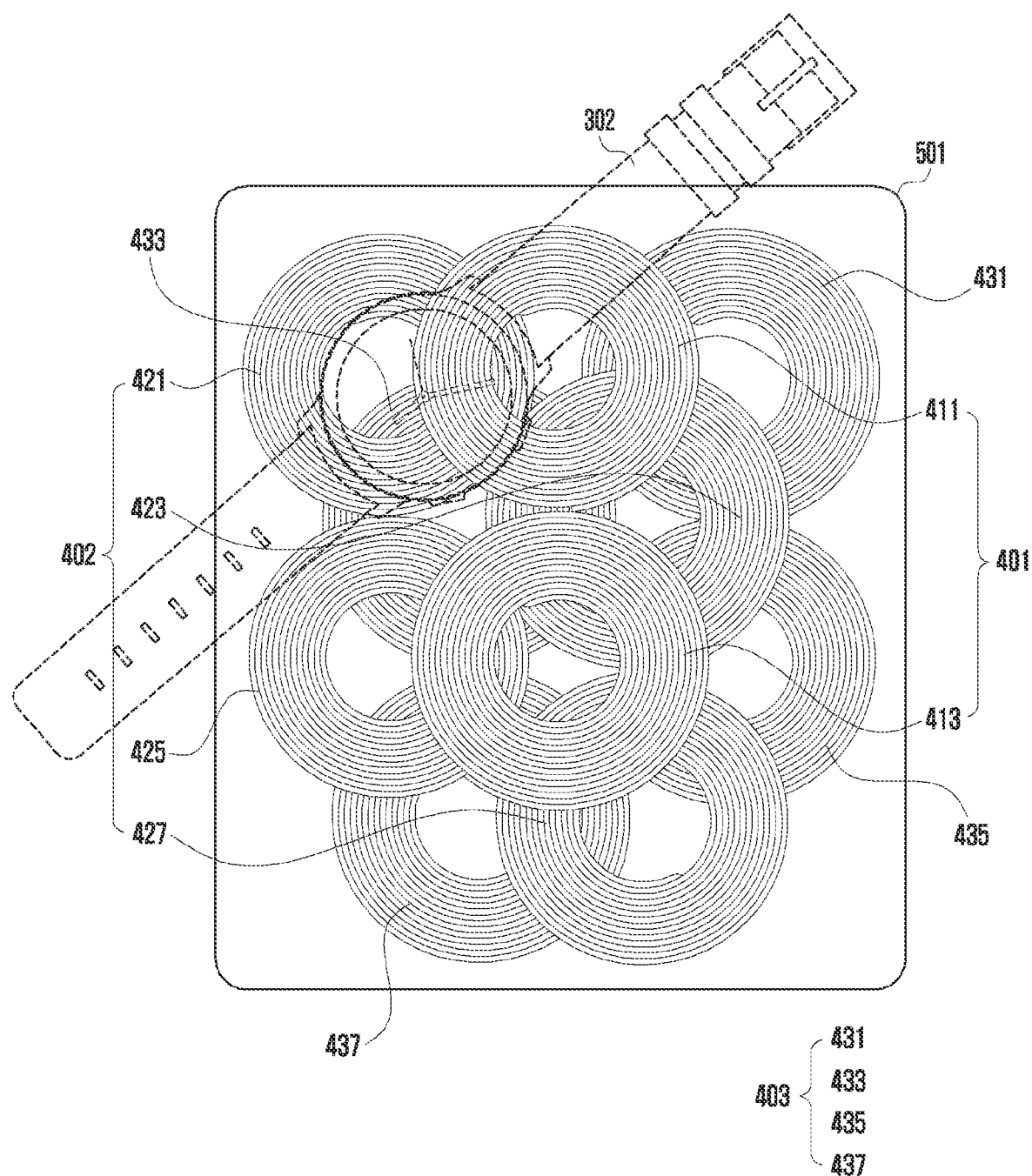
FIG. 7 is a diagram illustrating a charging operation when an electronic device is disposed above a wireless charging device according to an embodiment.

FIG. 7 is a diagram illustrating a charging operation when an electronic device (e.g., a watch) is disposed above a wireless charging device according to an embodiment.

Referring to FIG. 7, for charging, the electronic device 302 (i.e., a wireless charging receiver) may be disposed above a housing 304 of the wireless charging device 501 (i.e., a wireless charging transmitter). The electronic device 302 may comprise a watch (or a wireless earphone).

As shown, the electronic device 302 may be disposed above the first coil 411 of the first coil group 401 disposed in the first layer (e.g., an upper layer) of the wireless charging device 501 and above the third coil 421 of the second coil group 402 disposed in the second layer (e.g., an intermediate layer).

The processor 540 of the wireless charging device 501 may transmit a ping signal to the electronic device 302 through each of the first coil group 401 and the second coil group 402.

The processor 540 of the wireless charging device 501 may receive the feedback signal (e.g., SSP) through the first coil 411 of the first coil group 401 and the third coil 421 of the second coil group 402 above which the electronic device 302 is disposed. Then, based on the received feedback signal, the processor 540 may identify the position of the electronic device 302.

The processor 540 of the wireless charging device 501 may connect the first inverter 512 and the first coil 411 of the first coil group 401 through the first switch 514, and connect the second inverter 522 and the third coil 421 of the second coil group 402 through the second switch 524.

Using the first coil 411 of the first coil group 401 and the third coil 421 of the second coil group 402, the processor 540 of the wireless charging device 501 may output a charging voltage to the electronic device 302 and thereby perform wireless charging.

FIG. 8 is a flow diagram illustrating a method for charging an electronic device (i.e., a wireless charging receiver) by using a wireless charging device 501 (i.e., a wireless charging transmitter), according to an embodiment.

The descriptions of FIG. 8 are provided for example only, and may include the contents of various embodiments previously described in FIGS. 3A to 7.

At step 810, the processor 540 of the wireless charging device 501 may detect the electronic device 301 disposed above the housing 304 of the wireless charging device. For example, based on a change in impedance of at least one coil (e.g., the first coil 401 to the tenth coil 437), the processor 540 may detect that an object (e.g., the electronic device 301) is disposed above the wireless charging device 501.

At step 820, the processor 540 of the wireless charging device 501 may transmit a ping signal to the electronic device 302 through each of the first coil group 401, the second coil group 402, and the third coil group 403. For example, the processor 540 may transmit the ping signals through the first to tenth coils 401 to 437.

At step 830, the processor 540 of the wireless charging device 501 may receive a feedback signal (e.g., a signal strength packet (SSP)) for the ping signal from the electronic device 302, and thereby identify the position of the electronic device 302. For example, the electronic device 302 may transmit different feedback signals for the ping signals respectively received from the first to tenth coils 401 to 437.

At step 840, based on the position of the electronic device 302, the processor 540 of the wireless charging device 501 may connect at least one coil (e.g., the first coil 411 to the tenth coil 437) included in at least one coil group (e.g., the first coil group 401, the second coil group 402, and the third coil group 403) to the first inverters 512 to the third inverters 532 by using the first switch 514 to the third switch 534.

For example, the processor 540 of the wireless charging device 501 may connect one coil (e.g., the first coil 411) in the first coil group 401 to the first inverter 512 through the first switch 514, and connect one coil (e.g., the third coil 421) in the second coil group 402 to the second inverter 522 through the second switch 524.

At step 850, the processor 540 of the wireless charging device 501 may output a charging voltage to the electronic device 302 by using one coil (e.g., the first coil 411) in the first coil group 401 and one coil (e.g., the third coil 421) in the second coil group 402), and thereby perform wireless charging.

According to an embodiment, a method for charging an electronic device by using a wireless charging device (i.e., a wireless charging transmitter) may include, at a processor of the wireless charging device, detecting the electronic device through at least one coil in a first coil group or a second coil group; at the processor, transmitting a ping signal to the electronic device through each of the first coil group and the second coil group; at the processor, identifying a position of the electronic device upon receiving a feedback signal for the ping signal from the electronic device; at the processor, connecting a first inverter and one coil in the first coil group through a first switch and connecting a second inverter and one coil in the second coil group through a second switch; and at the processor, wirelessly transmitting power to the electronic device by using the one coil in the first coil group and the one coil in the second coil group.

The first coil group and the second coil group may be disposed in different layers.

A central axis of each of a plurality of coils included in the first coil group may not coincide with a central axis of each of a plurality of coils included in the second coil group.

The wireless charging device may include a first converter for supplying direct current (DC) power to the first inverter, and a second converter for supplying DC power to the second inverter.

The wireless charging device may include a first resonant element provided between the first inverter and the first coil group, and a second resonant element provided between the second inverter and the second coil group.

The wireless charging device may include a third inverter, a third switch electrically connected to the third inverter, and a third coil group connected to the third inverter through the third switch, and when the electronic device is detected, an output voltage may be outputted to the electronic device by using one coil in the first coil group, one coil in the second coil group, and one coil in the third coil group.

The wireless charging device may include a third resonant element provided between the third inverter and the third coil group.

The feedback signal may include a signal strength packet (SSP) signal, and a coil having a largest value of the SSP signal in the first coil group and a coil having a largest value of the SSP signal in the second coil group may be selected as operating coils.

A same voltage or different voltages may be supplied to the first inverter connected to the first coil group and the second inverter connected to the second coil group.

The first inverter connected to the first coil group and the second inverter connected to the second coil group may operate in a same phase or in different phases.

While the disclosure has been particularly shown and described with reference to exemplary embodiments thereof, it will be understood by those skilled in the art that various changes in form and details may be made therein without departing from the scope of the subject matter as defined by the appended claims.

What is claimed is:

1. A wireless charging device comprising:
   a first inverter,
   a first switch electrically connected to the first inverter;
   a second inverter,
   a second switch electrically connected to the second inverter;
   a first coil group connected to the first inverter through the first switch;
   a second coil group connected to the second inverter through the second switch; and
   a processor operatively connected to the first inverter, the first switch, the second inverter, the second switch, the first coil group, and the second coil group,
   wherein the processor is configured to:

detect an electronic device disposed above the wireless charging device through at least one coil in the first coil group or the second coil group, and wirelessly transmit power to the electronic device by using one coil in the first coil group and one coil in the second coil group, and wherein the processor is further configured to:

transmit a ping signal to the electronic device through each of the first coil group and the second coil group when the electronic device is detected, identify a position of the electronic device through a feedback signal including a signal strength packet (SSP) signal returned from the electronic device, and select, as operating coils, a coil having a largest value of the SSP signal in the first coil group and a coil having a largest value of the SSP signal in the second coil group.

2. The wireless charging device of claim 1, wherein the first coil group and the second coil group are disposed in different layers.

3. The wireless charging device of claim 1, wherein a central axis of each of a plurality of coils included in the first coil group does not coincide with a central axis of each of a plurality of coils included in the second coil group.

4. The wireless charging device of claim 1, further comprising:
a first converter for supplying direct current (DC) power to the first inverter; and
a second converter for supplying DC power to the second inverter.

5. The wireless charging device of claim 1, further comprising:
a first resonant element provided between the first inverter and the first coil group; and
a second resonant element provided between the second inverter and the second coil group.

6. The wireless charging device of claim 1, further comprising:
a third inverter,
a third switch electrically connected to the third inverter; and
a third coil group connected to the third inverter through the third switch,
wherein the processor is further configured to:
detect the electronic device disposed above the wireless charging device through at least one coil in the first coil group, the second coil group, or the third coil group, and
wirelessly transmit power to the electronic device by using one coil in the first coil group, one coil in the second coil group, and one coil in the third coil group.

7. The wireless charging device of claim 1, wherein the processor is further configured to supply a same voltage or different voltages to the first inverter connected to the first coil group and the second inverter connected to the second coil group.

8. The wireless charging device of claim 1, wherein the processor is further configured to control the first inverter connected to the first coil group and the second inverter connected to the second coil group to operate in a same phase or in different phases.

9. A method for charging an electronic device by using a wireless charging device, the method comprising:

at a processor of the wireless charging device, detecting the electronic device through at least one coil in a first coil group or a second coil group;

at the processor, transmitting a ping signal to the electronic device through each of the first coil group and the second coil group;

at the processor, identifying a position of the electronic device upon receiving a feedback signal for the ping signal from the electronic device;

at the processor, connecting a first inverter and one coil in the first coil group through a first switch and connecting a second inverter and one coil in the second coil group through a second switch; and at the processor, wirelessly transmitting power to the electronic device by using the one coil in the first coil group and the one coil in the second coil group, wherein the feedback signal includes a signal strength packet (SSP) signal, and wherein a coil having a largest value of the SSP signal in the first coil group and a coil having a largest value of the SSP signal in the second coil group are selected as operating coils.

10. The method of claim 9, wherein the first coil group and the second coil group are disposed in different layers.

11. The method of claim 9, wherein a central axis of each of a plurality of coils included in the first coil group does not coincide with a central axis of each of a plurality of coils included in the second coil group.

12. The method of claim 9, wherein the wireless charging device includes:
a first converter for supplying direct current (DC) power to the first inverter; and
a second converter for supplying DC power to the second inverter.

13. The method of claim 9, wherein the wireless charging device includes:
a first resonant element provided between the first inverter and the first coil group; and
a second resonant element provided between the second inverter and the second coil group.

14. The method of claim 9, wherein the wireless charging device includes:
a third inverter;
a third switch electrically connected to the third inverter; and
a third coil group connected to the third inverter through the third switch, and
wherein when the electronic device is detected, an output voltage is outputted to the electronic device by using one coil in the first coil group, one coil in the second coil group, and one coil in the third coil group.

15. The method of claim 14, wherein the wireless charging device includes:
a third resonant element provided between the third inverter and the third coil group.

16. The method of claim 9, wherein a same voltage or different voltages are supplied to the first inverter connected to the first coil group and the second inverter connected to the second coil group.

17. The method of claim 9, wherein the first inverter connected to the first coil group and the second inverter connected to the second coil group operate in a same phase or in different phases.

\* \* \* \* \*